United States Patent [19]
Crane

[11] Patent Number: 5,560,553
[45] Date of Patent: Oct. 1, 1996

[54] NOSE BAR DEFLECTOR FOR FIBERIZING HAMMERMILL

[75] Inventor: Ray Crane, Columbus, Miss.

[73] Assignee: Weyerhaeuser Company, Federal Way, Wash.

[21] Appl. No.: 372,195

[22] Filed: Jan. 13, 1995

[51] Int. Cl.$^6$ ............................................. B02C 13/282
[52] U.S. Cl. ........................... 241/186.1; 241/189.1
[58] Field of Search ........................... 241/186.1, 186.4, 241/189.1

[56]  References Cited

U.S. PATENT DOCUMENTS

| | | | |
|---|---|---|---|
| 1,751,009 | 3/1930 | Liggett . | |
| 2,087,559 | 7/1937 | Tolman . | |
| 3,266,656 | 8/1966 | Kridle | 220/4 |
| 3,854,269 | 12/1974 | Hancock | 52/754 |
| 3,940,007 | 2/1976 | Griffiths | 220/4 |
| 3,974,616 | 8/1976 | Beckley | 52/738 |
| 3,989,157 | 11/1976 | Veenema | 220/4 |
| 4,030,672 | 6/1977 | Borgqvist . | |
| 4,106,706 | 8/1978 | Burrows | 241/186.4 X |
| 4,221,302 | 9/1980 | Kupersmit | 220/4 |
| 4,693,386 | 9/1987 | Hughes et al. | 220/1.5 |
| 4,729,516 | 3/1988 | Williams, Jr. | 241/186.4 |
| 5,188,298 | 2/1993 | Gerber . | |
| 5,204,149 | 4/1993 | Phenicie et al. | 428/57 |
| 5,235,815 | 10/1993 | Bowns et al. . | |

FOREIGN PATENT DOCUMENTS

| | | |
|---|---|---|
| 4-87978 | 7/1990 | Japan . |
| WO94/01333 | 1/1994 | WIPO . |

*Primary Examiner*—Mark Rosenbaum
*Attorney, Agent, or Firm*—Christensen O'Connor Johnson & Kindness PLLC

[57] ABSTRACT

A unique hammermill for fiberizing sheet comprised of natural or synthetic fibers, that has a reduced tendency to clog entrance slots of the fibrous sheets into the interior of the hammermill. According to the invention, the hammermill has a nose bar deflector, mounted upstream of a feed slot and preferably extending along the entire length of the slot, to deflect fibers from the slot entrance, thereby preventing clogging of the slot. In one embodiment, the deflector is substantially triangular in cross section, wherein one side is affixed laterally along an upstream edge of a fibrous sheet feed slot, so that one side of the deflector slopes away from an internal surface of the hammermill shell to deflect fibers, carried along the surface of the shell, away from the feed slot, thereby preventing clogging. In other embodiments, the shape of the deflecting surface differs, but is designed to deflect fiber and particulates from the openings of downstream slots.

10 Claims, 3 Drawing Sheets

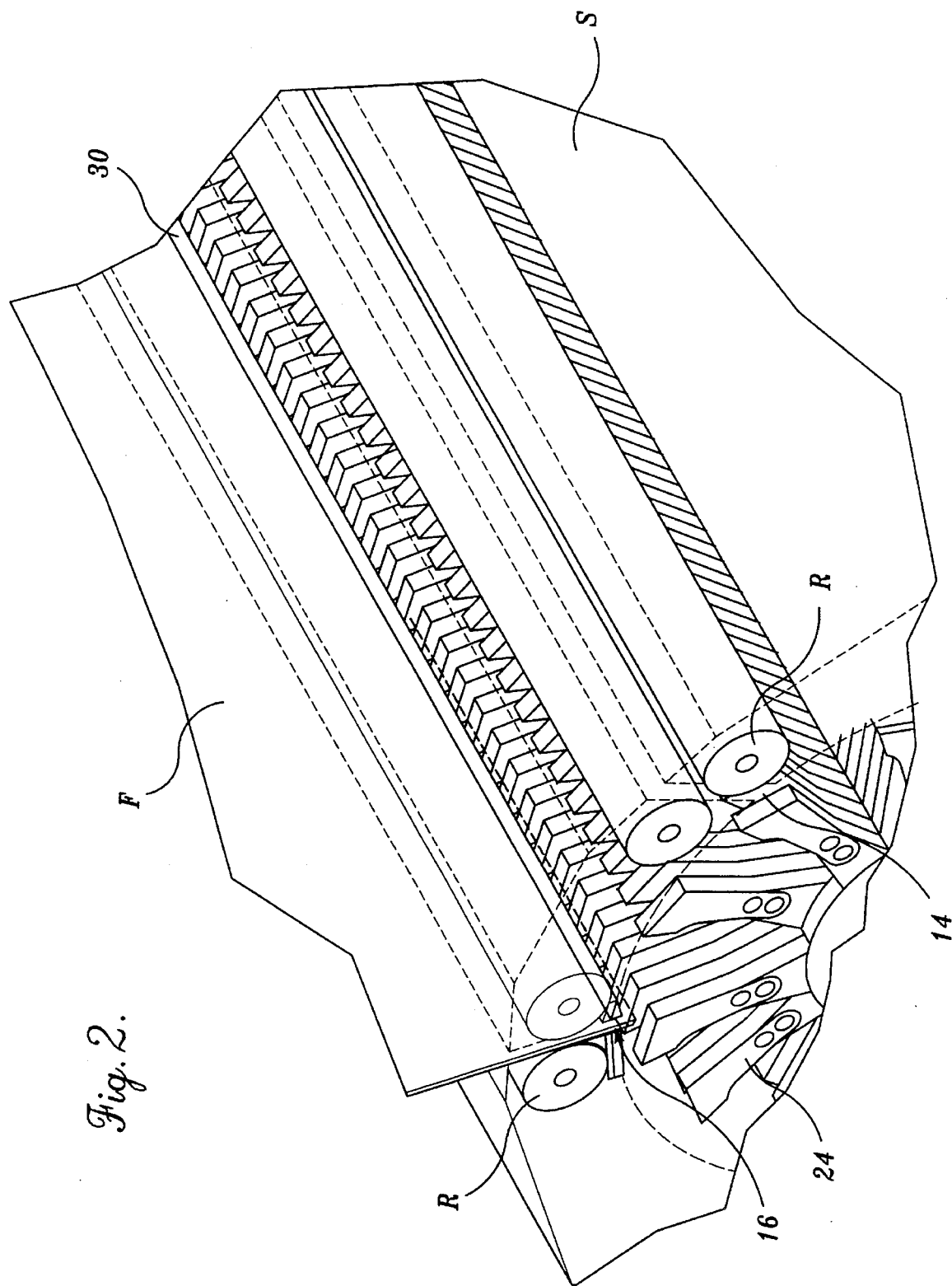

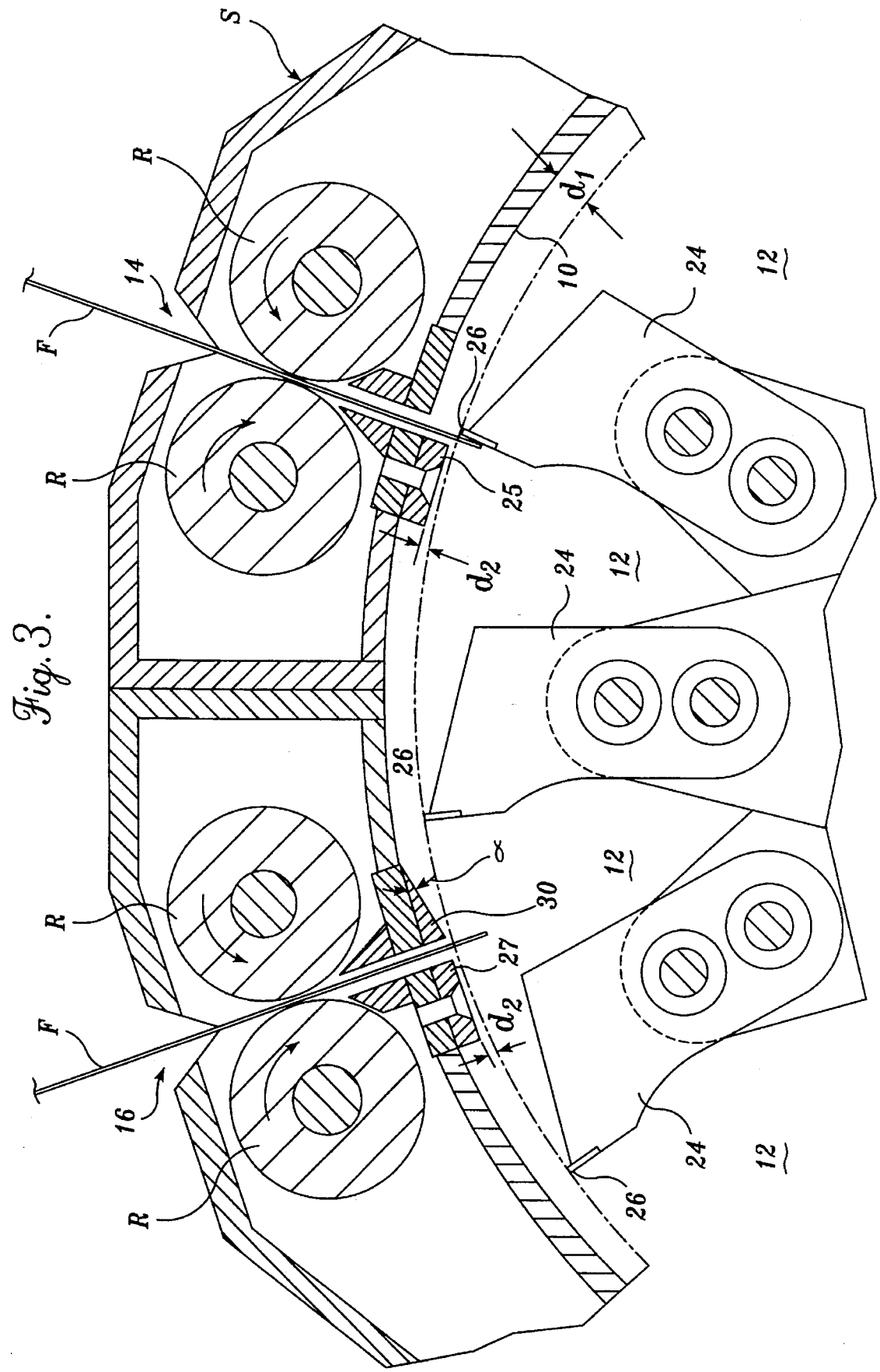

NOSE BAR DEFLECTOR FOR FIBERIZING HAMMERMILL

FIELD OF THE INVENTION

The invention relates to hammermills used for fiberizing sheets of material to produce fibers. More particularly, the invention relates to a device that prevents blockage of a fiber board feed entrance to the hammermill, thereby reducing down time needed to clean the entrance and enhancing utilization of the hammermill.

BACKGROUND OF THE INVENTION

The modern paper and pulp industry provides a wide variety of products, ranging from simple products, such as brown bags from recycled paper, to highly sophisticated products, such as paper-thin highly absorbent layered constructs that often contain a variety of synthetic additives, such as superabsorbent polymers, for use in products such as disposable diapers. Despite the wide range in the level of technology necessary to produce these products, they all have at least one factor in common, namely, all are fabricated from fibers. In some instances, the fibers are entirely of natural origin, whereas in other cases the fibers are synthetic or a mixture of synthetic and natural fibers.

For a variety of reasons, the manufacture of a particular fibrous product frequently requires the production of base stock fibrous sheets, which are then subject to "fibefization" to again produce fibers, and mixtures of fibers, that are then laid in webs for the production of other fibrous products that have a higher value. The production of these value-added products require an efficient mechanism for the fibefization of base stock fibrous sheets. Conventionally, the fiberization of the base stock sheets is carried out in a hammermill that has specific design features to enhance the fiberization process.

U.S. Pat. No. 5,253,815 (commonly owned) shows a hammermill design in which the hammers are configured to minimize dead spaces within the fiberizer to enhance throughput. In this design, a hammermill for fiberizing sheets or mats of fibers includes a housing within which an elongated rotor is positioned. The rotor has a longitudinal axis of rotation and a plurality of hammers radially extend from and are coupled to the rotor. Distal end surfaces of individual hammers sweep out separate cylindrical paths with gaps between the paths swept by other individual hammers. These gaps between the paths typically range from zero to no more than about one-quarter of an inch. At least one inlet is provided through which a base stock board is delivered to the cylindrical paths of the hammers for fiberization. Typically, the feed rate of the base stock board to be fiberized is controlled by a pair of seal rollers that engage either side of the sheet.

It has been a long-standing problem that hammermills that have more than one feed slot for receiving base stock fibrous sheet tend to clog up at a feedpoint, downstream of the first board feed slot that hammers encounter in a rotation cycle, after prolonged use. This necessitates turning off the hammermill, manually unclogging blocked feed slots, and then resuming the fiberizing operation. Not only does this unclogging operation result in incurring additional labor expenses, but the on-stream utilization time of the hammermill is reduced because of the time taken for unclogging operations. This inefficient utilization of expensive capital equipment is especially troublesome when all equipment is fully utilized and an increased demand for fiberizing capacity can only be obtained through purchase of an additional hammermill. To avoid, or at least delay, this capital outlay, it would be desirable to increase the on-stream availability and utilization of the existing fiberizing hammermills to obtain incremental fiberizing capacity.

SUMMARY OF THE INVENTION

The invention provides a unique hammermill that has a significantly reduced tendency to clog base stock fibrous sheet feed slots, thereby allowing greater hammermill utilization and also reducing the labor costs required to unclog hammermills. The invention provides a nose bar deflector plate which deflects fibers and fragments and prevents these fibers and fragments from lodging in, and ultimately clogging downstream feed slots.

It is theorized, without being bound, that fibrous material produced from a fibrous sheet inserted into a first (upstream) feed slot, is carried into the hammermill interior space where it undergoes further fragmentation or comminution. However, since the internal assembly of the hammermill, including the rotor and hammers, rotates at a high velocity, a significant amount of centrifugal force is imparted to fibrous material produced. Larger, heavier, or denser particulates and fibers are carried towards the internal surface of the hammermill and move slidingly against the surface in the direction of rotation of the rotor, carried by imparted momentum. Upon encountering a feed slot, the centrifugal force on these particulates and fibers may randomly force at least some of these into the feed slot. When a large enough quantity of such particles and fibers has accumulated at a particular feed slot, base stock sheet feed rate may be impeded, requiring a shutdown of the hammermill for unclogging the feed slot.

It is also theorized, without being bound, that at relatively low hammermill rates, the hammers clip tips of the sheets and bend these around the nose bars while board feed continues. However, when sheet feed rate increases beyond a certain rate, then the upstream sheet that has been clipped and bent presses hard against the upstream face of a sheet tip inserted into a downstream feed slot thereby hindering the feeding of the sheet through the slot.

The nose bar deflector of the present invention is installed on the internal surface of the hammermill shell, and extends longitudinally on the upstream side of a downstream slot to deflect particles and fibers from the slot. The deflector projects from the internal surface of the shell towards the interior of the hammermill to about the same extent as a nose bar, conventionally found on the downstream edge of the feed slot for supporting a rear side of a tip of board inserted into the hammermill when it is impacted by hammers. Thus, the hammers are able to operatively clear the deflector to carry out the fiberizing process. In a preferred embodiment, the deflector is of substantially triangular in cross section located adjacent the upstream edge of the downstream feed slot.

A deflecting surface of the nose bar deflector extends from the furthermost point of intrusion of the deflector into the interior space of the hammermill, upstream at an angle and intersects with the internal surface of the hammermill shell. As a result, fibers and fragments being dragged across the hammermill shell in the direction of rotation of the hammers, encounter the deflector, move along the angled deflecting surface of the deflector, and are carried by momentum into the interior of the hammermill, as if being propelled from a ski jump, away from the feed slot. Also, any sheet tips that may extend from upstream feed slots are redirected towards the interior of the hammermill into the paths of the rotating hammers.

The invention provides a simple and inexpensive solution to a long-standing problem in the art, thereby allowing greater utilization of capital equipment and a significant reduction in labor expense necessary for unclogging hammermills.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 2 is an isometric view of an upper section of a hammermill showing a nose bar deflector, in accordance with the invention, extending longitudinally upstream of the entire length of the downstream slot; and FIG. 3 is a schematic end view in cross section of an upper section of a hammermill showing the location of the nose bar deflector of the invention.

DETAILED DESCRIPTION OF THE PREFERRED EMBODIMENT

Figure 1:
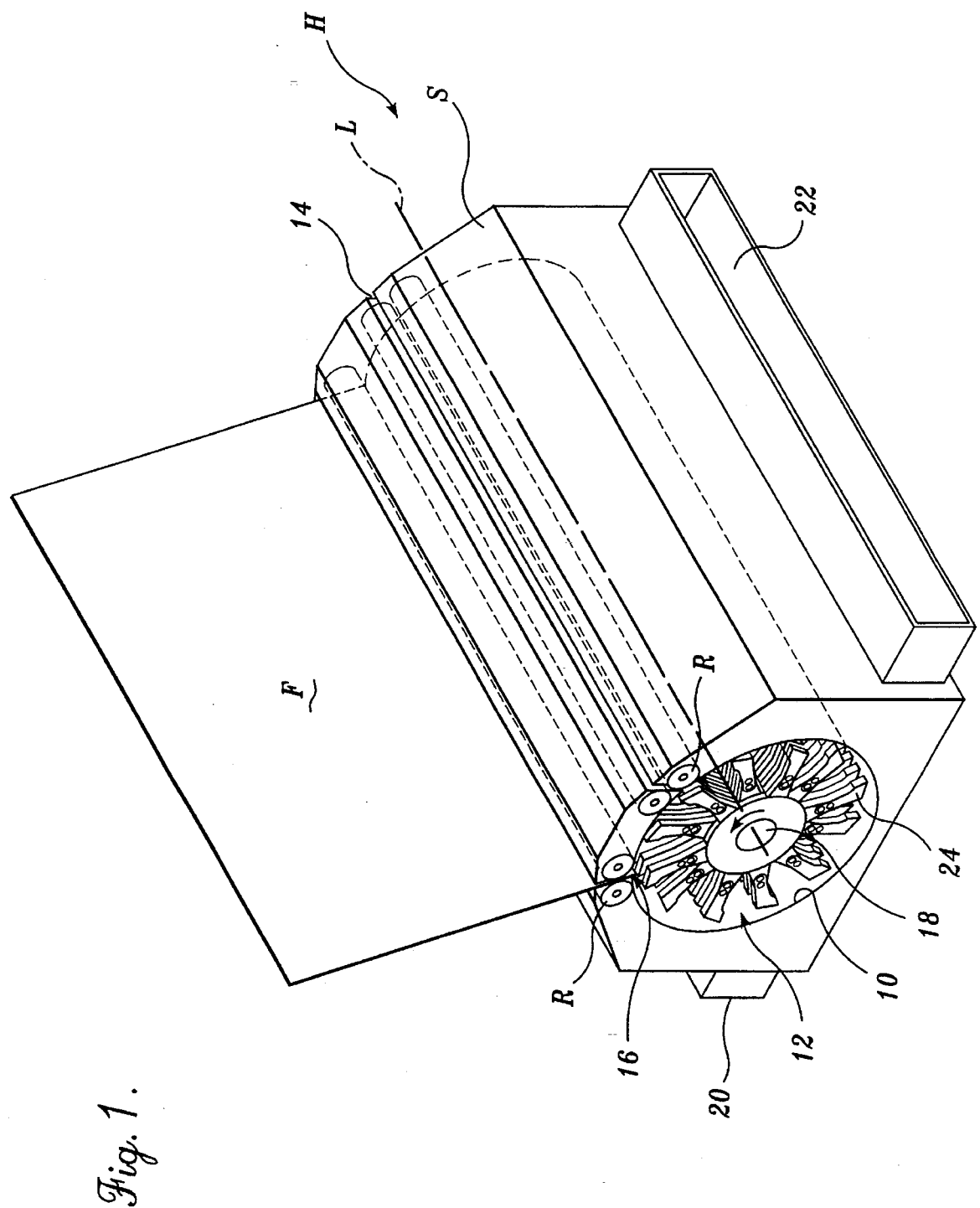
FIG. 1 is a schematic isometric view of a typical hammermill with an end plate removed to show internals.

The invention provides a unique hammermill for fiberizing sheets of fibrous material that reduces the risk of clogging of downstream feed slots, through which base stock fibrous sheets are :Fed into the hammermill for fiberization.

As a preliminary matter, the term "upstream" as used in the specification and claims with reference to a hammermill feed slot, means a feed slot first encountered by hammers when they rotate from a position at their lowest point in a cycle. The term "downstream" means a feed slot encountered by the hammers at a point in the cycle after the hammers have encountered an upstream feed slot and before returning to the lowest point in the cycle.

According to the invention, the hammermill H has a containment housing that includes a shell S which has an interior space 12, usually substantially cylindrical, with a longitudinal axis L that is defined by a surrounding internal surface 10 of the shell and end plates on either end of the shell. Fibers produced in the hammermill are entrained in and removed by air that enters the interior space 12 through air inlet duct 20 disposed on one side of the shell and that exits from the shell with entrained fibers through an outlet duct 22 on the other side of the shell. The shell has at least one upstream longitudinal fibrous sheet feed slot 14 in the housing, the slot being in communication with the interior space of the shell so that the end of a sheet of fibrous material F can be inserted into the interior space through the slot. Usually, the sheet F is controlledly fed into the slot by a pair of cylindrical rotating rollers R, one facing each side of the sheet. Further, the shell also includes at least one downstream longitudinal fibrous base stock sheet feed slot 16, circumferentially spaced apart from the upstream slot, which also communicates with the interior space 12, for inserting another sheet of fibrous base stock material into the hammermill. Again, the sheet F is controlledly fed into the hammermill through slot 16 between another set of rotating cylindrical rollers R.

The interior space 12 of the hammermill is occupied by a central, axially rotatable rotor 18 that extends along the longitudinal axis L of the interior space, from one end of the housing to the other. Further, a plurality of hammers 24 are mounted, usually in rows, radially on the rotor so that the hammers extend from the rotor towards the internal surface of the housing with an operative clearance gap d1 between the internal surface and extremities of the hammers, as shown in FIG. 3. Moreover, the hammers of each row are preferably mounted, at spaced apart positions, on the entire length of the rotor to maximize hammermill utilization, as shown in FIG. 2. Also, in certain instances it may be desirable to offset rows of radially projecting hammers from each other by a distance approximating the gap between the hammers within each row so that, upon rotation of the rotor R, successive rows of hammers will impact a sheet tip at offset locations and thereby efficiently impact an entire sheet tip.

The hammermill includes nose bars 25, 27 affixed to the internal surface 10 of the shell and extending longitudinally along substantially the entire lengths of the downstream edges of each of slots 14, 16 respectively, to support rear surfaces of sheet tip portions that are inserted into the feed slots, when hammers 24 impact the tips. The nose bars 25, 27 project from the internal surface 10 of the shell towards the interior space 12 and are sized for operative clearance with the hammers, with clearance gap d2, shown in FIG. 3.

The hammermill, according to the invention, includes a nose bar deflector 30 that is shaped to deflect fibers away from downstream feed slots in the hammermill shell. The deflector is sized for operative clearance with the hammers 24, when the hammers rotate to perform the fiberizing function, as shown in FIG. 3. According to the invention, the nose bar deflector preferably extends longitudinally on the entire upstream side of a downstream feed inlet slot and projects toward the interior containment space of the shell, as can be seen more clearly in FIG. 2.

The preferred nose bar deflector of the invention is substantially triangular in cross section, having three elongate side surfaces. The first elongate surface of the nose bar deflector has a first edge and a second edge and is positioned against the internal surface of the hammermill housing shell, lying substantially parallel to a tangent to the shell. A second elongate surface, joined to the first surface at the first edge, extends transversely to the first surface towards the interior of the shell. A third elongate, deflecting surface, slopes from the second edge of the first surface to an intersection with the second surface at an edge spaced apart from the internal surface of the shell. In a preferred embodiment, the third surface is flat and at lies an angle $\alpha$ of between about 10° and about 30°, more preferably between about 18° and 20° to the first surface.

While certain preferred embodiments of the invention have been illustrated and described, it will be appreciated that various changes can be made therein without departing from the spirit and scope of the invention as described above and claimed herebelow.

The embodiments of the invention in which an exclusive property or privilege is claimed are defined as follows:

1. A hammermill for fiberizing sheets of a fibrous material, the hammermill comprising:

(a) a hammermill containment housing comprising:

(i) a shell having an interior space defined by an internal surface of the shell, said internal surface surrounding a longitudinal axis of the interior space;

(ii) an upstream slot extending longitudinally across the shell and in communication with the interior space, for inserting a sheet of fibrous material into the interior space; and (iii) a downstream slot circumferentially spaced apart from the upstream slot and extending longitudinally across the shell, in communication with the interior space, for inserting a second sheet of fibrous material into the interior space;

(b) a central, axially rotatable rotor extending from one end of the interior space of the shell to another end thereof and positioned on the axis;

(c) a plurality of hammers mounted radially on the axially rotatable rotor, said hammers extending from said rotor towards the internal surface of the housing to provide a first clearance gap between said surface and extremities of the hammers;

(d) nose bars projecting from the internal surface of the shell into the interior space of the shell, the nose bars extending longitudinally along downstream edges of each slot for supporting rear surfaces of sheet tips inserted into the slots when hammers impact the tips; and (e) a nose bar deflector, projecting away from the internal surface of the housing into the interior space of the shell and positioned upstream of the downstream slot, the deflector extending longitudinally and parallel to said slot, the deflector shaped to deflect fibers away from the downstream slot and sized for operative clearance with the hammers, when the hammers rotate with the rotor.

2. The hammermill of claim 1, wherein the nose bar deflector comprises:

a first surface having a first edge and a second edge, the first surface positioned adjacent the internal surface of the shell;

a second surface extending laterally from the first surface at the first edge at an angle towards the interior space of the shell; and a third surface sloping inwardly from the second edge of said first surface to an intersection with said second surface to form an edge spaced from the internal surface of the shell.

3. The hammermill of claim 2, wherein the second surface is at a 90° angle to the first surface.

4. The hammermill of claim 2, wherein the first edge of the first surface of the nose bar deflector is coincident with an inner upstream edge of the downstream slot of the housing.

5. The hammermill of claim 4, wherein the third surface of the nose bar deflector slopes at an angle of between about 18° to about 20° to the first surface of the deflector.

6. A hammermill for fiberizing sheets of a fibrous material, the hammermill comprising:

(a) a hammermill containment housing comprising;

(i) a shell having an longitudinal axis, the shell surrounding an interior containment space of the housing, (ii) an upstream slot extending longitudinally across the shell for inserting a sheet of fibrous material into the interior containment space of the housing, and (iii) a downstream slot extending longitudinally across the shell and circumferentially spaced from the upstream slot, the downstream slot adapted for the insertion of a fibrous sheet of material into the interior containment space of the housing;

(b) an axially rotatable rotor centrally located in the interior containment space of the shell and extending from one end of said shell to another end of said shell in a direction substantially parallel to the longitudinal axis of the shell;

(c) a plurality of hammers fixedly mounted on the axially rotatable rotor, said hammers extending radially from said rotor towards a surrounding internal surface of the shell to provide a first clearance gap between said surface and extremities of the hammers;

(d) nose bars projecting from the internal surface of the shell into the interior containment space, the nose bars extending longitudinally along downstream edges of the slots for supporting tip portions of sheets inserted into the slots when hammers impact tips of the sheets; and (e) a nose bar deflector extending longitudinally along an upstream edge of the downstream feed slot and projecting away from the internal surface of the shell towards the interior containment space of the housing, said nose bar deflector sized for operative clearance with the plurality of hammers, when the hammers rotate with the axially rotatable rotor.

7. The hammermill of claim 6, wherein the nose bar deflector comprises:

a first surface having a first edge and a second edge, the first surface abutting against the internal surface of the shell;

a second surface extending laterally from the first surface at the first edge at an angle towards the interior space of the shell; and a third surface sloping inwardly from the second edge of said first surface to an intersection with said second surface to form an edge spaced from the internal surface of the shell.

8. The hammermill of claim 7, wherein the third surface slopes at an angle of between about 18° and about 20° to the first surface.

9. The hammermill of claim 8, wherein the first surface of the nose bar deflector is at about a 90° angle to the second surface of the nose bar deflector.

10. The hammermill of claim 6, wherein the nose bar has a substantially triangular cross section.

\* \* \* \* \*